Figure 1:
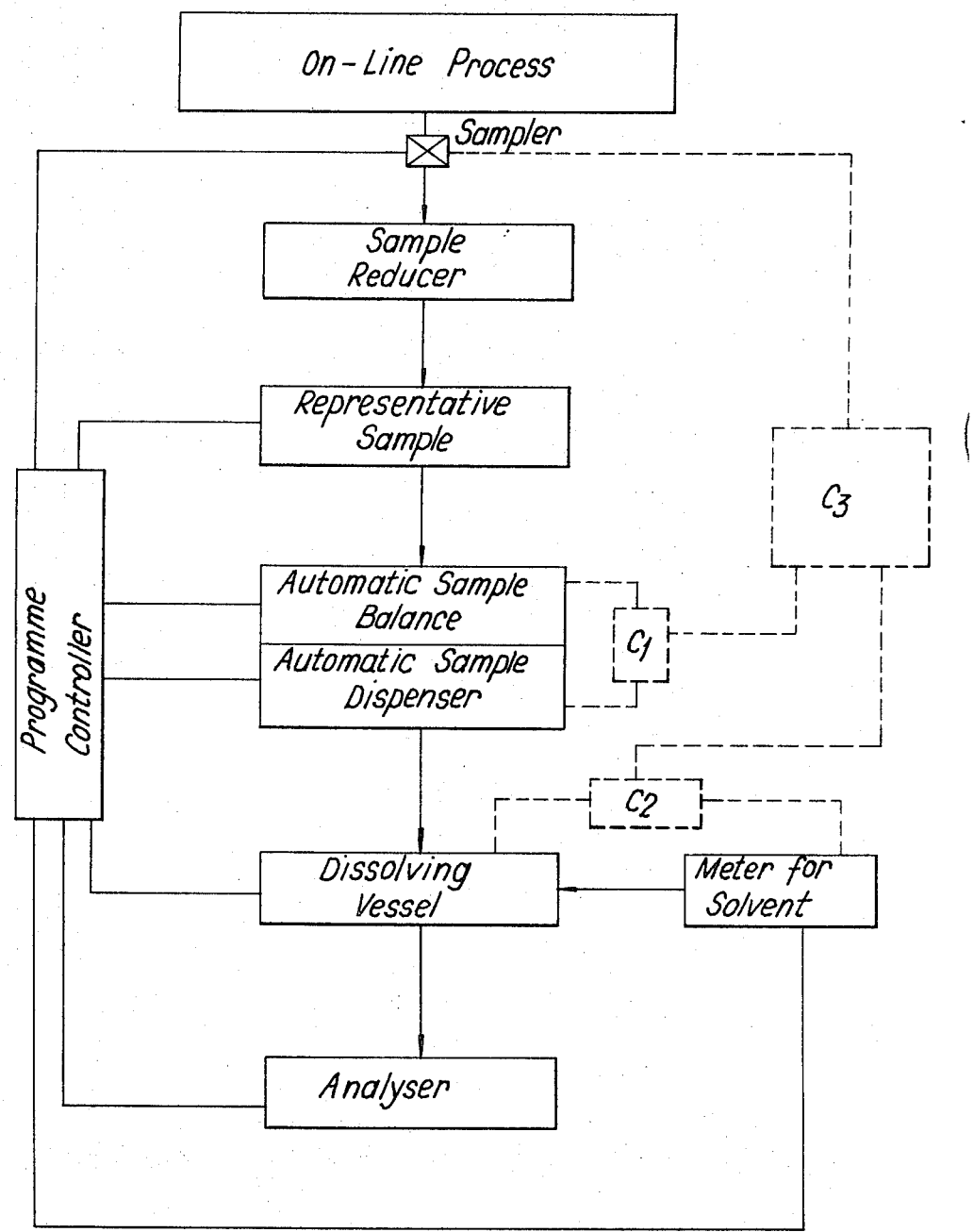

United States Patent
Hulley

[15] 3,668,934

[45] June 13, 1972

[54] METHOD AND APPARATUS FOR PRODUCT SAMPLING

[72] Inventor: Bernard James Hulley, Stockton-on-Tees, England

[73] Assignee: Imperial Chemical Industries Limited, London, England

[22] Filed: June 11, 1970

[21] Appl. No.: 45,382

[30] Foreign Application Priority Data

June 23, 1969 Great Britain.....................31,607/69

[52] U.S. Cl. ..............................................73/421 R, 73/53
[51] Int. Cl. .........................................................G01n 1/28
[58] Field of Search.............73/421 R, 422; 23/259.1, 230 A

[56] References Cited

UNITED STATES PATENTS 1,811,233  6/1931  Harrison............................23/230 A
3,104,946  9/1963  Veal...................................23/230 A X
2,636,387  4/1953  McKinney et al....................73/422 R Primary Examiner—Louis R. Prince
Assistant Examiner—William A. Henry, II
Attorney—Cushman, Darby & Cushman

[57] ABSTRACT

A method and apparatus for preparing product samples for automatic on-line analysis, wherein a programed controller causes a series of steps to be carried out in sequence, each for a preselected time, said steps including withdrawing a sample from the process, accurately weighing a preselected quantity thereof, discharging the weighed sample to a mixer, accurately measuring and metering a preselected quantity of liquid to the mixer, mixing the weighed sample and measured liquid, and withdrawing the resulting homogeneous liquid mixture to an analyzer.

6 Claims, 2 Drawing Figures

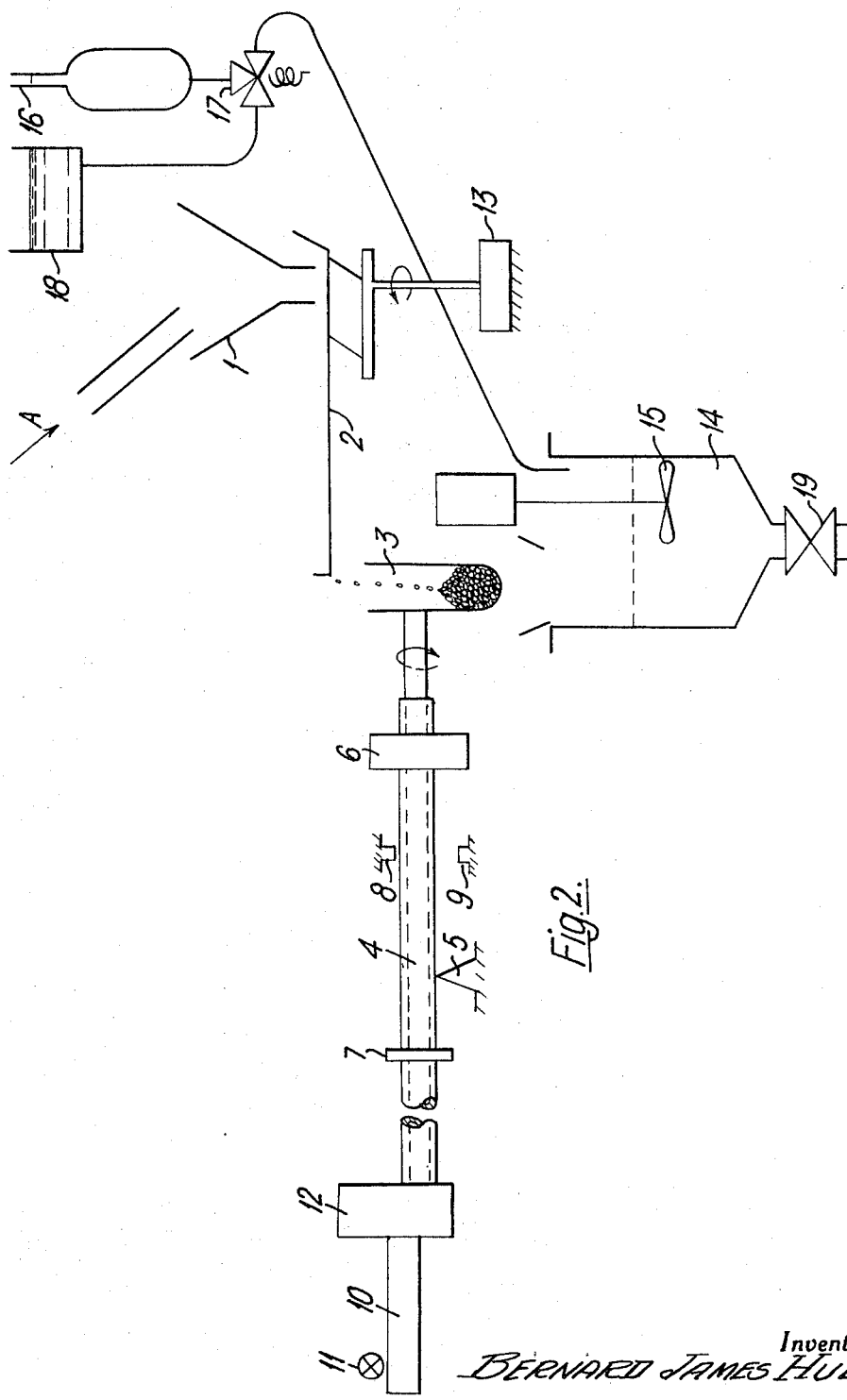

METHOD AND APPARATUS FOR PRODUCT SAMPLING

The present invention relates to a method and apparatus for preparing samples for automatic on-line analysis of products. Though by no means limited thereto, the invention is particularly applicable to the automatic on-line analysis of prilled or granular fertilizers, but as will be evident from the ensuing description it is equally applicable to any soluble product and, indeed, to any product which can form an emulsion, dispersion, suspension or the like with a liquid. For purposes of simplicity, however, the invention will hereinafter be described with particular reference to prilled or granular fertilizers which are soluble in water.

Basically, the object of the present invention is automatically to withdraw from an on-line process, at preselected regular intervals, a representative sample of the product (for example a prilled granular fertilizer), to separate therefrom and accurately weigh a preselected quantity thereof (hereinafter called the "weighed sample"), to discard the remainder of the representative sample, accurately to meter a preselected quantity of a solvent (for example water) and to dispense the "weighed sample" into a dissolving vessel, to stir until the weighed sample is completely dissolved in the solvent, and thereafter to release the solution into a vessel for analysis (hereinafter called an "analyzer"). These are the basic steps, to be carried out in sequence, and they are initiated in their proper sequence, monitored and allowed to continue, each for an adequate preselected period of time, and then stopped, by a programed controller. After each adequate preselected period of time (adequate, that is to say, for the step in question to be completed) the programed controller stops the step in question and initiates the next step. When the final step has been completed, the programed controller (after a preselected interval) again initiates the very first step of all (namely the withdrawal of a representative sample of the product from the on-line process) and repeats the entire sequence of steps.

Thus, purely by way of example, the controller may be programed to deliver to the analyzer, exactly every 6 minutes, exactly 50 grams of fertilizer from the on-line process fully dissolved in exactly 1 liter of water. The controller will therefore be programed by means of a timer module (as hereinafter described) so that each step is allowed to continue for a preselected number of seconds, after which the step is discontinued and the next step is initiated, the total time allotted to all the steps totaling 6 minutes.

It will be appreciated that instead of a single controller, it is equally possible to work with a plurality of connected controllers, each programed to initiate, monitor and discontinue (after the appropriate preselected period of time) one or more of the above-mentioned individual steps. It will also be appreciated that although the controller (or plurality of controllers) is programed to operate automatically as described above, it may be provided (as is customary in programed controllers) with one or more switching means so that each, any, some, or all, of the above-mentioned individual step may be carried out "manually" (that is to say, independently of the other); this is particularly useful, for example, if one wishes to analyze, possibly for purposes of comparison, a fertilizer other than that being produced by the on-line process.

The present invention accordingly provides a method for preparing samples for the automatic on-line analysis of a product, which comprises a sequence of steps which includes automatically withdrawing from an on-line process, at preselected regular intervals, a sample of the product exceeding a preselected weight, separating from said sample and accurately weighing a sample of exactly said preselected weight (hereinafter referred to as the "weighed sample"), discarding the remainder of said sample in excess of said preselected weight, accurately measuring a preselected quantity of liquid (hereinafter referred to as the "measured liquid"), dispensing said weighed sample and said measured liquid into a mixing vessel provided with a stirrer, stirring the contents of said vessel for a preselected period of time adequate for said weighed sample to form a wholly homogeneous solution, dispersion, suspension, emulsion or the like with said measured liquid, and dispensing the resulting solution, dispersion, suspension, or emulsion or the like into a collecting vessel for analysis, said steps being effected in sequence, and each for its own preselected period of time, by means of a controller (or a plurality of connected controllers) programed to initiate each step and, after a preselected period of time from the initiation of said step, to discontinue said step and to initiate the next succeeding step in the sequence of steps.

The invention further provides apparatus for preparing samples for the automatic on-line analysis of a product, comprising a sequence of components which includes an automatically actuated sampler adapted to remove from an on-line process, at preselected regular intervals, a sample of the product exceeding a preselected weight, means for feeding said sample to an automatically actuated sample balance adapted (a) to separate from said example and accurately weigh a sample of exactly said preselected weight (hereinafter referred to as the "weighed sample") (b) to discard the remainder of said sample in excess of said preselected weight, and (c) to dispense said weighed sample into a mixing vessel provided with a stirrer, automatically actuated measuring and metering means for accurately measuring a preselected quantity of liquid (hereinafter referred to as the "measured liquid") and for dispensing said measured liquid into said mixing vessel, means for automatically actuating said stirrer for a preselected period of time adequate for said weighed sample to form a wholly homogeneous solution, dispersion, suspension, emulsion or the like with said measured liquid, automatically actuated means for dispensing the resulting solution, dispersion, suspension, emulsion or the like into an analyzer, and a controller (or a plurality of connected controllers) programed to energize and actuate said components in sequence and, after a preselected period of time for each of said components, to deenergize said component and energize and actuate the next succeeding component in the sequence.

It will be appreciated that, within certain limits, the order in which certain (but not all) steps are programed to occur may be varied without affecting the overall operation of the system. The measured liquid, for example, may be dispensed into the mixing vessel during any step after the mixed solution has been discharged to the analyzer, and may occur simultaneously with other steps such as the weighing step, provided it is completed before the stirring step is reached.

One embodiment of the invention is hereinafter described with reference to the accompanying drawings, wherein:

FIG. 1 is a block diagram illustrating the basic method and apparatus of the invention; and FIG. 2 is a more detailed view of the most important component parts of the apparatus, illustrating how each of them is actuated in its due turn.

Referring, firstly, to FIG. 1, the program controller is programed to withdraw from an on-line process, say every 6 minutes, a sample of the product through the sampler, which may be in the form of a sampler valve which the program controller opens and subsequently closes after a preselected period of time when a quantity of the product exceeding a preselected weight has been drawn off from the on-line process. This sample may, if desired, but not necessarily, be passed through a sample reducer or divider which reduces or divides the sample to a fraction, for example one-sixteenth, of its original weight; this is particularly useful when the sampler withdraws samples from a number of points along the on-line process, so that a truly representative sample of the product is obtained.

The program controller closes the sampler (and, if used, the sample reducer) after a preselected time when the amount of the representative sample obtained exceeds a preselected weight (say 50 grams), whereafter it opens an outlet, such as a valve, for a preselected time sufficient to allow the representative sample to be fed (e.g., through a sample chute) to an automatic sample balance and thence to an automatic sample dispenser, each of which are actuated and stopped after preselected periods of time.

The automatic sample balance and automatic sample dispenser are conventional units (described in greater detail hereinafter). Their primary function, however, is to weigh out accurately exactly the above-mentioned preselected weight of the sample (e.g., 50 grams) from the representative sample and to separate this "weighed sample" from the representative sample. After a preselected period of time allowed for this weighing operation, the weighed sample is passed to an automatic weighed sample dispenser, and the programmed controller causes the unused portion of the representative sample to be discarded, e.g., through a waste chute.

The programed controller now causes the automatic "weighed sample" dispenser to open for a preselected period of time sufficient for the whole of the "weighed sample" to be passed to a dissolving vessel provided with one or more stirrers. However, before, during, or after this latter step, the programed controller also initiates the measurement (for example, in a pipette) during a preselected period of time of an accurately measured preselected quantity (e.g., 1 liter) of a solvent such as water whereafter it meters (for example by pumping) said preselected quantity of solvent into said dissolving vessel, starts and actuates the stirrer or stirrers for a preselected period of time sufficient to ensure complete solution of the sample in the liquid, whereafter the stirrer or stirrers are stopped, and the programed controller opens a release valve or the like for a preselected period of time sufficient to allow the prepared solution of pass from the dissolving vessel to a sample reservoir or analyzer, thereafter closing said release valve or the like.

Precisely 6 minutes from the start of the whole cycle (or whatever period is preselected therefor) the programed controller again causes the sampler (or sampler valve) to withdraw a fresh sample of the product from the on-line process, and the whole cycle recommences anew. Although, as shown in FIG. 1, the entire cycle may be programed, monitored, and controlled by a single programed controller, it will be appreciated that the same effect can be obtained by using a plurality of interconnected controllers (for example, $C_1$, $C_2$, and $C_3$ shown in dotted lines in FIG. 1). Controller $C_1$ is programed for the automatic sample balance and dispenser, and $C_2$ for the solvent measuring-and-metering and the dissolving vessel, but both of these are subservient to a master controller $C_3$ which also programs, monitors, and controls the sampler.

Turning to FIG. 2, it will be observed that the cycle or sequence of steps has already begun, in that the programed controller has already arranged for the sampler to withdraw a sample from the on-line process in the direction of the arrow A and, if desired, after passing the sample through a sample reducer or divider (not shown) to deliver to the automatic sample balance, through a funnel or the like 1, a representative sample of the product in excess of a preselected amount may be, for example, 50 grams. The representative sample is, in fact, fed into a trough-shaped feeder 2 which is adapted to be vibrated at two speeds at least (one considerably faster than the other) and in so doing to gradually vibrate a part of the representative sample of the product into a weigh-pan 3 at one end of the balance 4.

The balance 4, not unnaturally, includes a fulcrum 5 and, if desired, coarse and trim weight adjustments 6, 7, respectively, for greater accuracy of weighing, and top and bottom stops 8, 9, respectively. In particular, however, the end of the balance arm remote from the weigh-pan 3 comprises a vane or the like 10, positioned between a lamp and a photocell, generally designated 11. The arrangement is such that when the weigh-pan 3 is empty, or only partially filled, the vane 10 at the other end of the balance 4 is sufficiently low not to come between the lamp and the photocell 11 and the balance 4 is so programed by the controller that under these conditions the trough feeder 2 vibrates, and feeds the representative sample into the weigh-pan 3, at a relatively fast rate. As the weight of the contents of the weigh-pan increases, this would normally means that the vane 10 would rise and interrupt the beam from the lamp to the photocell 11, and this interruption constitutes a signal to the controller to switch the trough-feeder 2 from its relatively fast to its relatively slow rate of vibration. To ensure that this does not occur too soon, a counterweight 12 is provided at or near the vane end 10 of the balance 4 to ensure that the vane 10 does not begin to rise until a preselected percentage (say, 90 percent) of the preselected weight (50 grams) of the representative sample has been vibrated into the weigh-pan 3. At this point, the vane 10 rises and interrupts the beam from the lamp to the photocell 11, thereby slowing down the vibration rate of the trough feeder 2 so that the last 10 percent of the representative sample is fed to the weigh-pan 3 very slowly, thereby making very accurate weighing possible. Self-evidently, this causes the vane 10 to rise even further and the arrangement is such that immediately the exactly preselected weight of the sample has been fed into the weigh-pan 3, the vane 10 rises clear of the lamp-beam and the photocell 11, and this constitutes a further signal to the programed controller for a number of operations to be effected or initiated, either in sequence or simultaneously. These include:

a. actuating a reversible motor 13 which causes the feeder trough 2 to rotate in a substantially horizontal plane away from the weigh-pan 3;

b. tipping the weigh-pan 3 by means of a reversible pan-tipping motor 12 (which may also act as the above-mentioned primary counterweight 12) so that the weighed sample is tipped into the dissolving vessel 14;

c. setting the stirrer 15 in motion;

d. returning the weigh-pan 3 to its original upright position;

e. causing the feeder trough 2 to discharge the unused remainder of the representative sample into a waste-collecting bin or the like (not shown);

f. actuating the reversible motor 13 which causes the feeder trough 2 to rotate in a substantially horizontal plane back to its original position immediately above the weigh-pan 3;

g. filling a pipette 16 provided with a three-way valve 17 with a preselected quantity of solvent (for example, 1 liter) from a head tank or the like 18;

h. actuating the pipette's three-way valve 17 so that the preselected, accurately measured quantity of solvent is discharged into the stirred dissolving vessel 14;

i. continuing stirring until the solid is completely dissolved in the solvent;

j. stopping the stirrer 15;

k. actuating a release valve or the like 19 so that the solution is discharged from the dissolving vessel 14 into a sample reservoir or analyzer (not shown);

l. closing said release valve 19 of the dissolving vessel 14;

m. reenergizing the sampler so that the entire cycle recommences.

The following is a typical example of one automatic cycle, lasting exactly 6 minutes, of the method according to the invention:

| Step No. | Duration (seconds) | Action |
| --- | --- | --- |
| 1 | 7 seconds | Sampler is operated to withdraw representative sample. |
| 2 | 20 seconds | The lamp is energised, illuminating the photocell which then initiates the weighing process by starting the feeder vibrating at medium rate. The vane cuts the light beam causing the feeder to vibrate at low rate. If the full weight is reached during this step an alarm light indicates a too-fast filling rate. |
| 3 | 15 seconds | The full weight is normally reached, and the feeder stopped during this step. |

| | | |
|---|---|---|
| 4 | normally 1 | If the full weight has been reached by this step the cycle continues normally. Otherwise the step is prolonged until either the full weight is reached or 30 minutes has elapsed. |
| 5 | 17 seconds | The feeder trough is turned to the reject chute. |
| 6 | 2 seconds | The weigh-pan is tipped and the stirrer is operated. |
| 7 | 2 seconds | The weigh-pan returns and the stirrer continues. |
| 8 | 100 seconds | The feeder discharges to waste and the stirrer continues. |
| 9 | 17 seconds | The feeder trough returns and the mixing vessel is discharged to the analyser. |
| 10 | 100 seconds | The pipette is filled. |
| 11 | 60 seconds | The pipette is discharged to the mixing vessel. |
| 12 | 19 seconds | Spare step. |

It will be readily apparent to those skilled in the art that the program controller may take many forms, but in one embodiment of the invention it may comprise the following conventional units:

a. A Ring Counter Module

This is a solid-state plug-in module with 12 steps corresponding to the 12 stages of the automatic cycle described above. An indicator light shows which step is energized. The movement from one step to the next is initiated by a signal from a Timer Module hereinafter described.

b. A Timer Module

This is also a plug-in module, based on the charging of a capacitor, and gives out a signal to the ring counter module to move on one step when it reaches a predetermined potential. The rate of charge and, therefore, the duration of a step is determined by which of a set of 12 resistors the capacitor is being charged through. There is a separate resistor for each step so the duration of each may be independently chosen.

The timer module may be operated manually be depressing a lever switch which suspends automatic operation, and the ring counter module may be caused to step on at one cycle per second by operating a pushbutton switch until the desired step is reached.

Another feature is that step No. 4 (which, on normal automatic operation, lasts only 1 second) may be prolonged, if the full weight has not been reached, either until it has or until 30 minutes have elapsed.

c. A Manual Control Module

Another plug-in module, this unit carries ancillary circuits (such as a photocell trigger and solenoid buffer amplifiers) as well as switches which enable the separate functions of the instrument to be controlled manually. These switches over-ride the automatic control of the solenoid valves, but not the automatic control of the reversible motors so it is desirable to stop the cycle at step No. 12 before checking operations manually.

Two additional controls are:- i. a "Test Cycle" enabling a weighing-out operation to be initiated only when on manual operation.

ii. A "Stop Dump" which prevents discharge of excess fertilizer and enables the instrument to be tested using standardized fertilizer, without it being discharged during step No. 8.

On the panel of this module there are also three lights which show:

i. When the full weight has been reached (green)
ii. Whether it was reached too rapidly for accuracy (amber)
iii. If it was reached too slowly (red)

d. A Relay Unit

This controls the weighing sequence, the reversing motors and the vibrating feeder excitation. It can be pulled forward to observe or change individual relays, but cannot be withdrawn.

e. Power Unit

This is a standard power unit, except for a re-arrangement of the power transformer primary taps to provide 110 volts for the reversing motors.

I claim:

1. Apparatus for preparing samples for the automatic on-line analysis of a product, comprising a sequence of components which includes at least one controller programed to energize and actuate said components in sequence and, after a preselected period of time for each of said components, to deenergize said component and energize and actuate the next succeeding component in the sequence, an automatically actuated sampler adapted to remove from an on-line process, at preselected regular intervals, a sample of the product exceeding a preselected weight, an automatically actuated sample balance and means for feeding said sample thereto, said automatically actuated sample balance being adapted (a) to separate from said sample and accurately weigh a sample of exactly said preselected weight (hereinafter referred to as the "weighed sample") (b) to discard the remainder of said sample in excess of said preselected weight and (c) to dispense said weighed sample into a mixing vessel, said automatic sample balance comprising an automatic sample dispenser, a vibratable feeder trough adapted to feed the sample into said automatic sample dispenser until said dispenser contains said preselected weight of the sample, said program controller being adapted to start vibrating said feeder trough and to stop vibrating it when said sample dispenser contains said preselected weight of the sample, automatically actuated liquid measuring and metering means for accurately measuring a preselected quantity of liquid (hereinafter referred to as the "measured liquid") and for metering said measured liquid into said mixing vessel, means for automatically actuating said mixing vessel for a preselected period of time adequate for said weighed sample to form a homogeneous liquid mixture with said measured liquid, an analyzer and automatically actuated means for discharging the resulting liquid mixture thereto.

2. Apparatus as claimed in claim 1, wherein said vibratable feeder trough is adapted to reject to waste the remainder of the sample, in excess of said preselected weight, during a preselected period of time.

3. Apparatus as claimed in claim 1, wherein said mixing vessel is a stirred mixer and said automatic sample dispenser is adapted to be inverted for a preselected period of time, so that the weighed sample falls into said stirred mixer, and thereafter to be restored to its original position.

4. Apparatus as claimed in claim 3, wherein said liquid measuring and metering means comprises pipette means adapted to be filled with and to meter a preselected quantity of liquid into said stirred mixer during a preselected period of time.

5. Apparatus as claimed in claim 4, wherein said weighed sample and liquid are stirred in said mixer for a preselected period of time, and including means for thereafter withdrawing the resulting liquid mixture to said analyzer.

6. Apparatus as claimed in claim 1, including a sample reducer adapted to reduce the sample, during said preselected period of time, to a fraction of its original weight, said fraction exceeding said preselected weight.

* * * * *